US009911450B1

(12) United States Patent
Wang et al.

(10) Patent No.: US 9,911,450 B1
(45) Date of Patent: Mar. 6, 2018

(54) OPTICAL STORAGE SYSTEM DIVIDER BASED DRAW VERIFICATION WITH AUTOMATIC BIAS OR DELAY ADJUSTMENT

(71) Applicant: Oracle International Corporation, Redwood City, CA (US)

(72) Inventors: Lingtao Wang, Broomfield, CO (US); Forrest Lundstrom, Westminster, CO (US); Matthew C. Fienberg, Northborough, MA (US); Scott D. Wilson, Thornton, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/243,457

(22) Filed: Aug. 22, 2016

(51) Int. Cl.
- *G11B 7/135* (2012.01)
- *G11B 7/1395* (2012.01)
- *G11B 7/1263* (2012.01)

(52) U.S. Cl.
CPC .......... *G11B 7/1395* (2013.01); *G11B 7/1263* (2013.01)

(58) Field of Classification Search
None
See application file for complete search history.

(56) References Cited

U.S. PATENT DOCUMENTS

| | | |
|---|---|---|
| 4,415,938 A | 11/1983 | Heitmann |
| 4,488,277 A | 12/1984 | McFarlane et al. |
| 4,980,878 A | 12/1990 | Szerlip |
| 5,105,413 A | 4/1992 | Bakx |
| 5,130,965 A | 7/1992 | Karaki et al. |
| 5,267,226 A | 11/1993 | Matsuoka et al. |
| 5,673,245 A * | 9/1997 | Yanagawa ............ G11B 7/0031 369/112.29 |
| 5,708,639 A | 1/1998 | Iwanaga |
| 5,808,991 A | 9/1998 | Inoue |
| 5,909,418 A | 6/1999 | Noda et al. |

(Continued)

FOREIGN PATENT DOCUMENTS

| | | |
|---|---|---|
| EP | 0731455 | 9/1996 |
| EP | 0860827 | 8/1998 |

(Continued)

OTHER PUBLICATIONS

Optical head Design for 1TB Optical Tape Drive, Mandad Manavi et al., LOTS Technology, Inc., May 2000.

(Continued)

*Primary Examiner* — Peter Vincent Agustin
(74) *Attorney, Agent, or Firm* — Invoke

(57) ABSTRACT

An optical storage system includes an optical head and a controller. The optical head is configured to split a light beam into a higher power main beam and a lower power side beam. The controller is configured to write data to an optical medium via the higher power main beam, and read, directly after writing, feedback from the optical medium containing the written data and noise caused by the higher power main beam. The controller is also configured to process the feedback using data indicative of the higher power main beam to remove the noise and generate output indicative of the written data, and automatically adjust a delay of the feedback or the data indicative of the higher power main beam based on a signal quality of the output.

20 Claims, 6 Drawing Sheets

(56) References Cited

U.S. PATENT DOCUMENTS

| | | | |
|---|---|---|---|
| 6,141,312 A | 10/2000 | Masters et al. | |
| 8,451,702 B2 | 5/2013 | Mahnad | |
| 2002/0003758 A1* | 1/2002 | Kubo | G11B 7/0901 |
| | | | 369/44.37 |
| 2003/0016598 A1* | 1/2003 | Tsuda | G11B 7/1381 |
| | | | 369/44.23 |
| 2003/0210632 A1* | 11/2003 | Shimozawa | G11B 7/1263 |
| | | | 369/53.26 |
| 2007/0041300 A1* | 2/2007 | Minemura | G11B 20/10009 |
| | | | 369/59.22 |
| 2008/0225656 A1 | 9/2008 | Stallinga et al. | |
| 2009/0022024 A1 | 1/2009 | Hayashi | |
| 2011/0103202 A1 | 5/2011 | Ichikawa | |
| 2011/0141863 A1 | 6/2011 | Mahnad | |
| 2013/0051203 A1* | 2/2013 | Mahnad | G11B 7/1395 |
| | | | 369/44.38 |
| 2013/0077456 A1* | 3/2013 | Takahashi | G11B 7/133 |
| | | | 369/53.23 |

FOREIGN PATENT DOCUMENTS

| | | |
|---|---|---|
| EP | 1610304 | 12/2005 |
| JP | H05073913 | 3/1993 |
| JP | S63166025 | 7/1998 |

OTHER PUBLICATIONS

MicroContinuum: Technology: Data Storage, "Optical Tape—A new Way to Archive Data", Copyright 2008.

* cited by examiner

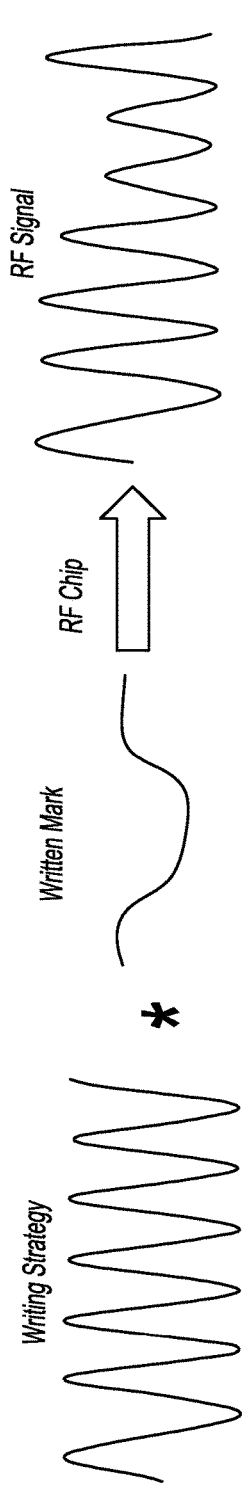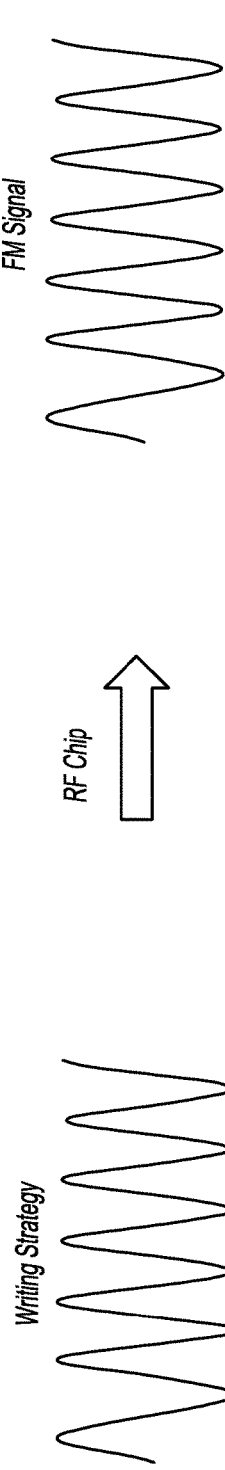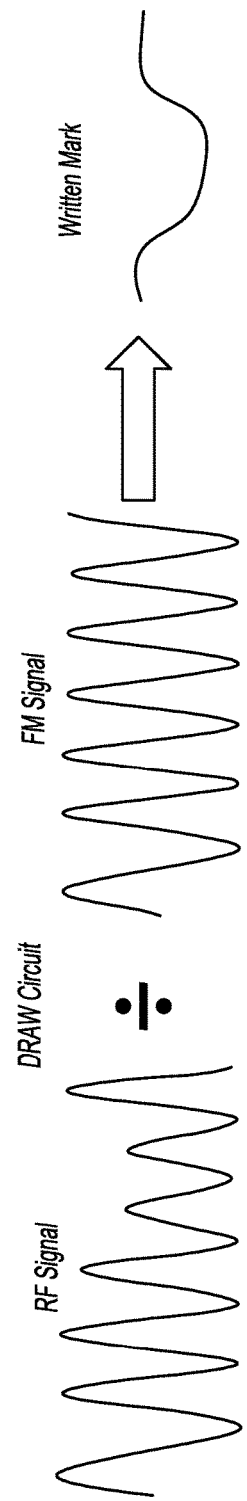

OPTICAL STORAGE SYSTEM DIVIDER BASED DRAW VERIFICATION WITH AUTOMATIC BIAS OR DELAY ADJUSTMENT

TECHNICAL FIELD

This disclosure relates to techniques for verifying data in an optical storage system.

BACKGROUND

Optical recording devices such as optical disk and optical tape drives commonly use an Optical Pickup Unit (OPU) or read/write head to write and retrieve data from associated optical media. Conventional OPUs may utilize different wavelength semiconductor laser diodes with complex beam path optics and electromechanical elements to focus and track the optical beam within one or more preformatted tracks on the medium to write or store the data and subsequently read the data. Data written to the medium with a laser at higher power may be verified in a separate operation or process after writing using a lower laser power, or may be verified during the write operation by another laser or laser beam. The ability to read and verify the data during the write operation may be referred to as Direct Read After Write (DRAW).

Current OPUs may use a diffraction grating or similar optics in the laser path to generate three beams from a single laser element including a higher power beam used for reading/writing data and for focusing, and two lower power satellite beams used for tracking. The three beams are focused to three corresponding spots on the surface of the optical storage medium used by the various optical and electromechanical elements of the OPU. In general, the higher power spot is positioned in the center or middle between the two satellite spots. In addition to reading/writing data and focusing, the center spot may also be used for one particular type of tracking operation in some applications. The lower power satellite spots generated from the lower power side beams are typically used for another type of tracking operation for specific types of media.

SUMMARY

Optical storage systems and methods of performing direct read after write for the same utilize circuitry and/or controllers configured to process signals read directly after writing to remove noise introduced by the writing. Because the writing process involves high-frequency writing strategy pulses in the laser's optical power for creating the crystal phase change on the optical recording layer of the media, the direct read laser power signal from the laser light sensor during the write contains modulation of the written data and the high-frequency writing pulses. Division of the signals by representations of writing strategy waveforms may cancel out the noise and recover the written data. The delay or bias associated with the signals and waveforms may be automatically adjusted based on a signal quality associated with the recovered written data.

In one embodiment, an optical storage system includes an optical head and controller arrangement that, while writing data to an optical medium via a higher power main beam, generates output indicative of the data, directly after the writing, from division of a first signal resulting from a lower power side beam being reflected from the medium and a second signal resulting from scatter of the higher power main beam. The system also automatically adjusts a direct current (DC) bias or delay associated with at least one of the signals according to a signal quality of the output.

In another embodiment, a method for performing direct read after write on an optical medium includes writing data to the medium via a higher power main beam, and directly after the writing, processing a first signal containing the written data and noise caused by the higher power main beam and a second signal indicative of the higher power main beam to remove the noise and generate output indicative of the written data. The method also includes automatically adjusting a direct current bias of at least one of the signals according to a signal quality of the output.

In yet another embodiment, an optical storage system includes an optical head that splits a light beam into a higher power main beam and a lower power side beam. The system also includes a controller that writes data to an optical medium via the higher power main beam, and reads, directly after writing, feedback from the optical medium containing the written data and noise caused by the higher power main beam. The controller also processes the feedback using data indicative of the higher power main beam to remove the noise and generate output indicative of the written data, and automatically adjusts a delay of the feedback or the data indicative of the higher power main beam based on a signal quality of the output.

BRIEF DESCRIPTION OF THE DRAWINGS

FIGS. 3A through 3C are diagrams illustrating components associated with RF and FM signal wave forms, and the result of their division.

DETAILED DESCRIPTION

Various embodiments of the present disclosure are described herein. However, the disclosed embodiments are merely exemplary and other embodiments may take various and alternative forms that are not explicitly illustrated or described. The Figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the Figures may be combined with features illustrated in one or more other Figures to produce embodiments that are not explicitly illustrated or described. The combinations of features illustrated provide representative embodiments for typical applications. However, various combinations and modifications of the features consistent with the teachings of this disclosure may be desired for particular applications or implementations.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 1A:
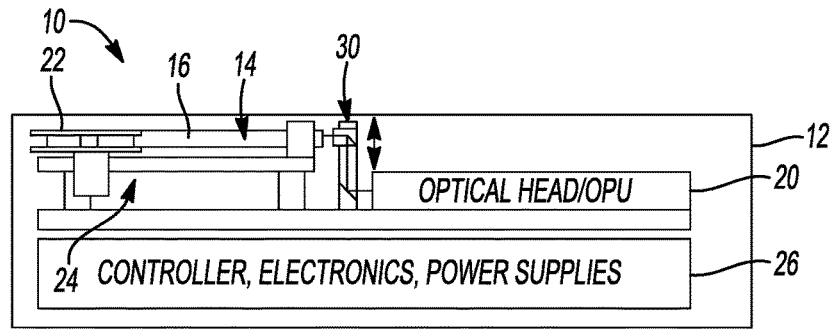
FIGS. 1A and 1B are block diagrams illustrating operation of an example optical data storage system or method with direct read after write (DRAW) capability.
Figure 1B:
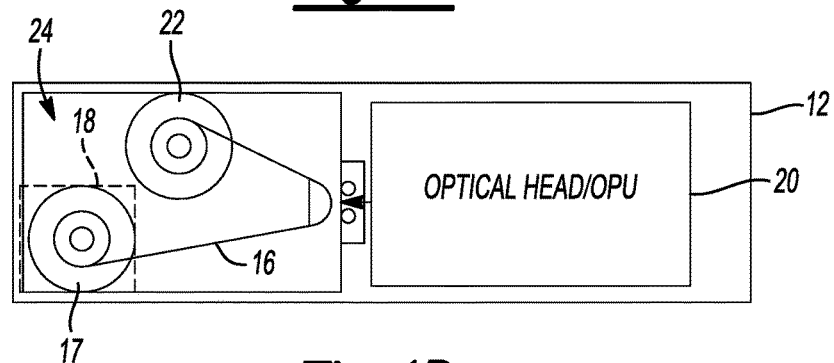

Referring now to FIGS. 1A and 1B, block diagrams illustrating operation of an example optical data storage system or method with direct read after write (DRAW) capability are shown. FIG. 1A is a side view diagram and FIG. 1B is a top or plan view diagram. In this embodiment, optical data storage system 10 is an optical tape drive 12 that receives an optical data storage medium 14, which is an optical tape 16. While illustrated and described with reference to an optical tape drive, those of ordinary skill in the art will recognize that the teachings of the present disclosure may also be applied to various other types of optical data storage devices that may use various types of write-once or re-writable optical media, such as optical discs. The optical tape 16 is a ½ inch (12.7 mm) wide tape having a plurality of tracks 36 generally extending across the width of the tape and may vary in length depending on the desired storage capacity and performance characteristics as illustrated and described in greater detail herein. Other tape configurations and dimensions, however, are also possible. The optical tape 16 may be wound on an associated spool 17 contained within a protective case or cartridge 18 that is manually or automatically loaded or mounted in the optical tape drive 12. Transport mechanism 24 moves the optical tape 16 through a carriage and past at least one optical pickup unit (OPU) or optical head 20 to a take-up spool 22 that typically remains within the tape drive 12. The OPU 20 writes data to, and reads data from, the optical tape 16 as the transport mechanism 24 moves the optical tape 16 between the cartridge 18 and take-up spool 22 in response to at least one controller and associated electronics 26. As explained in greater detail below, data may be read/written to the optical tape 16 in one or more of the tracks 36 in a serpentine fashion as the tape travels in either direction past the OPU 20, i.e., either from the cartridge 18 to the take-up spool 22, or from the take-up spool 22 to the cartridge 18.

The optical head 20 may include associated optics and related electromechanical servo controlled devices, represented generally by reference numeral 30, that split or divide a light beam, such as a laser beam, into two or more beams that are focused to corresponding spots on the storage medium 16 for reading/writing data as illustrated and described in greater detail with reference to FIG. 2. Various servo mechanisms (not specifically illustrated) may be used to position/align the beams with a selected one of the tracks 36 on the optical tape 16.

Figure 2:
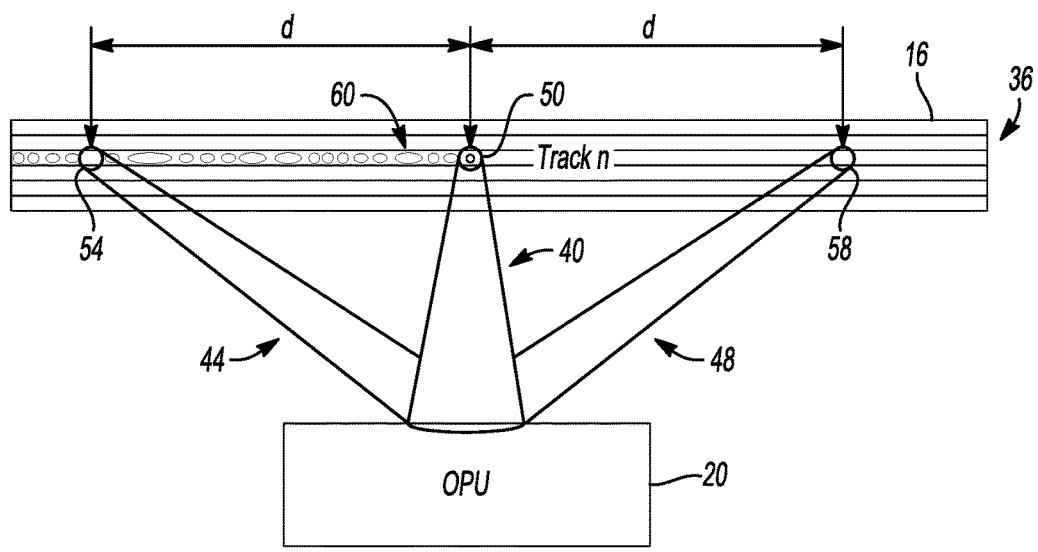
FIG. 2 is a block diagram illustrating operation of the optical pickup unit (OPU) of FIGS. 1A and 1B having a coherent light beam split or divided into a center beam and two satellite or side beams to provide DRAW capability.

FIG. 2 is a block diagram illustrating operation of the optical pickup unit (OPU) 20 having a coherent light beam split or divided into a center beam 40 and two satellite or side beams 44, 48 to provide DRAW capability. The beams 40, 44, 48 may be generated by a single or common coherent light source, such as a laser diode, for example. The source beam travels through associated optics, that may include a diffraction grating, for example, to divide or split the source beam into the center beam 40, first side beam 44, and second side beam 48 and to focus the beams to corresponding spots 50, 54, and 58, respectively, on the surface of the optical tape 16 within a selected one of the tracks 36. The three optical spots 50, 54, and 58 are manipulated by various optical and electrometrical elements of the OPU 20 to write and retrieve data from the optical tape 16.

The optical elements used to split the source beam and focus the resulting beams to the spots 50, 54, and 58 may be designed to provide higher power to the center beam 40 and center spot 50 with lower power to the side beams 44, 48 and associated spots 54, 58. For example, the center spot 40 may contain about 90% of the source beam power with the side beams 44, 48 dividing the remaining 10% of the source beam power. The center beam 40 is modulated by the OPU 20 to generate write marks 60 during writing of data to the optical tape 16, which may require about ten times more average power than to read previously stored data (such as about 7 mW to write data and about 0.3 mW to read data, for example). As such, if the source beam is modulated and produces sufficient power for writing data using the center beam/spot 40/50, the side beams 44, 48 will be modulated in a like manner but will contain insufficient power to alter the tape 16.

In this embodiment, the spots 50, 54, and 58 are mechanically aligned in the OPU manufacturing process to correspond to the axes of the data tracks 36. In addition, the satellite spots 54, 58 are generally symmetrically positioned relative to the center spot 50 so that transit distance (d) of the tape 16 between the center spot 50 and either of the satellite/side spots 54, 58 is substantially the same. Other embodiments may include a distance (d) of between about 10-20 µm—although other distances are also contemplated.

Certain conventional optical storage devices use the center spot 50 from the higher power emitting beam 40 for reading, writing, and focusing in addition to one type of tracking operation. The satellite spots 54, 58 formed by the lower power side beams 44, 48 are used for another type of tracking for specific types of media. In these applications, the side spots 54, 58 may not be aligned with one another, or with the center spot 50 along a single one of the tracks 36.

As previously described, the source laser beam is operated at a higher power (relative to operation during a data read/retrieval) and modulated to write the data marks 60 on a selected one of the tracks 36 on the optical tape medium 16. However, only the center beam 40 emits enough power to the optical tape 16 to actually alter the structure of the optically active layer. The satellite beams 44, 48, having much lower power as determined by the diffraction grating power distribution, do not alter the tape 16. They, however, have enough power after being reflected from the optical tape 16 to detect the data marks 60. Therefore depending on the direction of travel of the optical tape 16, the reflection from one or both of the associated satellite spots 54, 58 can be detected by the OPU 20 and used to verify the data marks 60 directly after being written by the main beam/spot 40/50 to provide DRAW operation. While the reflected beam associated with one of the satellite beams 44, 48 (depending on the direction of travel of the tape 16) contains information associated with the data marks 60 on the tape medium 16, the reflected beam is heavily contaminated by the modulation of the center beam 40 and other noise sources and generally exhibits a very low signal to noise ratio (SNR).

Here, some of the DRAW systems and algorithms contemplated use a demodulation/division method to verify written data during the write operation in real-time. For example during the write operation, the written data is decoded (read) from a reflected laser light signal by a high frequency demodulation circuit (divider circuit). Then, the signal quality of the decoded written data can be calculated by a Bit-Error-Rate (BER) detector in order to verify the written data. As a result, the time between data writing and data decoding in this example is less than 1 msec.

As mentioned above, data written by the main spot 50 could be read back by one of the satellite spots 54, 58 after a few micro seconds. The satellite spots 54, 58, however, only have a fraction of the light intensity of the main spot 50. Thus, the light intensity signal detected by either one of the satellite spots 54, 58 is modulated (distorted) with high-frequency laser pulses used for writing. In order to better decode the written data, the satellite spot reflected laser light intensity signal (RF signal) can be demodulated from the main spot writing laser pulse signal (FM signal) using, for example, a DRAW demodulation circuit in order to reverse the modulation caused by the writing pulsation of the laser diode. Also, frequency responses of the RF signal and FM signal can be matched by applying a matched filter before the demodulation. A filter and high-frequency demodulator, therefore, can be designed for decoding and verifying written data during the write operation. Thus, the demodulation and verification of written data can be in real-time.

Certain DRAW circuits contemplated herein require much less calculation cost by using a high frequency demodulator (e.g., analog high speed divider). This enables the operation of DRAW for multiple channels (e.g., 24 channels) simultaneously. Other advantages may include small size, low cost, and high speed for multi-channel designs.

FIG. 3A shows that the RF signal detected by a corresponding RF chip (e.g., a photodetector chip, PDIC, placed at the end of the reflected optical light path of the OPU 20) not only contains data associated with the written mark being read but also the writing strategy waveform embodied by the main spot 50 at the time the written mark was being read. That is, the RF signal is subject to noise introduced by the writing strategy waveform. FIG. 3B shows that the FM signal detected by a corresponding FM chip (e.g., a front monitor chip, FMIC, placed at the laser light output path of the OPU 20) from the scatter associated with the center beam 40 is essentially the writing strategy waveform. FIG. 3C shows that the division of the RF signal by the FM signal via a DRAW circuit yields the written mark.

A voltage of the RF signal, $V_{RF}$, can be represented as $$V_{RF}=k_{RF}\times\phi\times R \quad (1)$$

where $k_{RF}$ is a constant associated with the RF chip, $\phi$ is the writing strategy modulated light intensity, and R is the changed reflectivity of the medium indicative of a written mark. And, a voltage of the FM signal, $V_{FM}$, can be represented as $$V_{FM}=k_{FM}\times\phi \quad (2)$$

where $k_{FM}$ is a constant associated with the FM chip. Dividing (1) by (2) yields k×R, where k is $k_{RF}/k_{FM}$. Because $k_{RF}$ and $k_{FM}$ are known, R can be obtained free of influence from $V_{FM}$.

Figure 4:
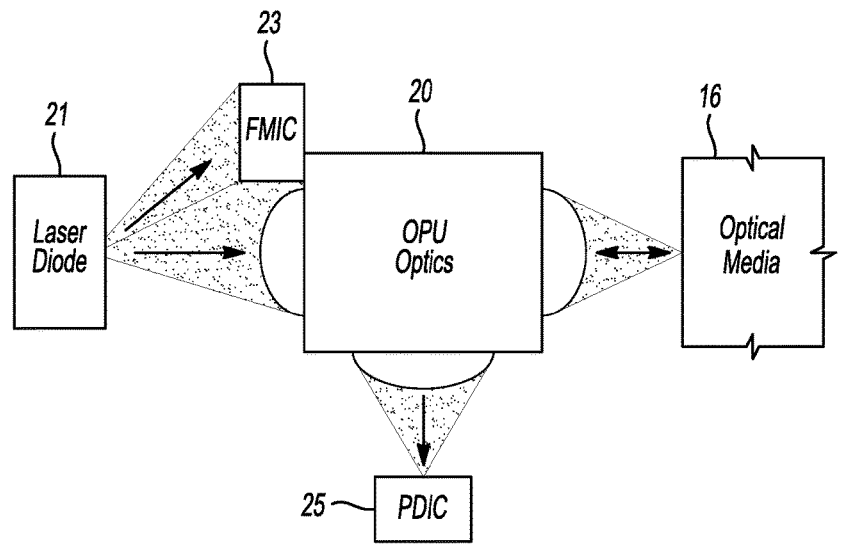
FIG. 4 is another block diagram illustrating operation of the example optical data storage system of FIGS. 1A and 1B.

FIG. 4 shows the OPU 20 and an FMIC chip 23 arranged to receive laser light from a laser diode 21. That is, the FM signal from the FMIC chip 23 represents the direct light output of the laser diode 21 without any modification by the OPU 20 or media 16. And, a PDIC chip 25 is arranged to receive light reflected from the media 16 and through the OPU 20.

Figure 5:
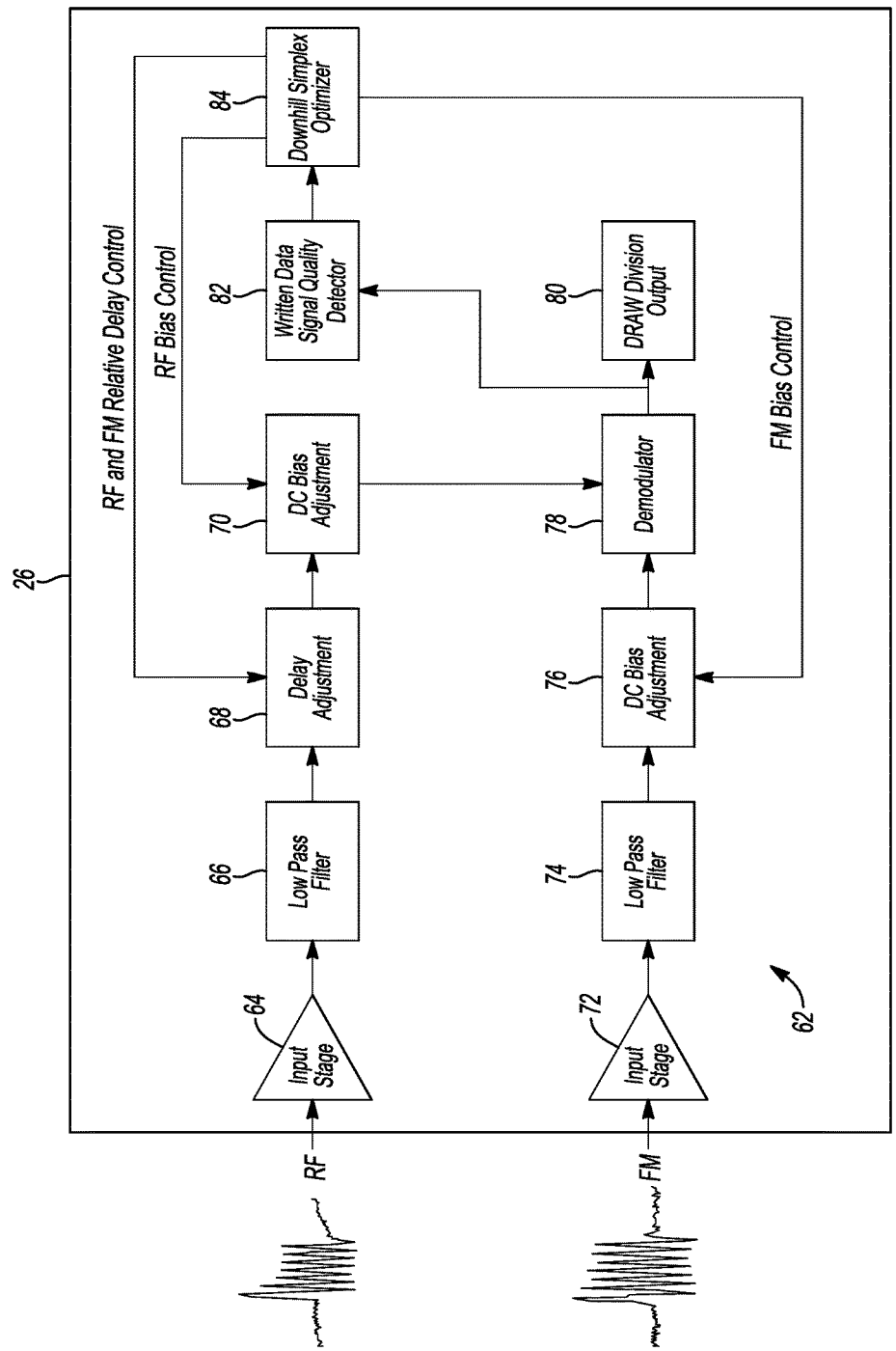
FIG. 5 is a block diagram illustrating an example DRAW demodulation circuit.

FIG. 5 shows the at least one controller and associated electronics 26 implementing an analog DRAW demodulation circuit 62 to perform the signal division described above. In this example, the circuit 62 includes an RF signal input stage 64, a low pass filter 66, a delay adjustment 68, and a direct current (DC) bias adjustment 70. The circuit 62 also includes an FM signal input stage 72, a low pass filter 74, a DC bias adjustment 76, a demodulator 76 (e.g., multiplier, op-amp, inverter, etc. similarly arranged to that of FIG. 5), a DRAW division output 80, a written data signal quality detector 82, and a downhill simplex optimizer 84. The signal process flow associated with the RF signal is the input stage 64 to the low pass filter 66, the low pass filter 66 to the delay adjustment 68, the delay adjustment 68 to the DC bias adjustment 70, and the DC bias adjustment 70 to the demodulator 72. The signal process flow associated with the FM signal is the input stage 72 to the low pass filter 74, the low pass filter 74 to the DC bias adjustment 76, and the DC bias adjustment 76 to the demodulator 78. The signal process flow associated with the demodulator output is the demodulator 78 to the DRAW division output 80, and the demodulator 78 to the written data signal quality detector 82, and the written data signal quality detector 82 to the downhill simplex optimizer 84. The downhill simplex optimizer 84 then provides control signals to the delay adjustment 68, the DC bias adjustment 70, and the DC bias adjustment 76.

The demodulator 78 can implement any suitable arrangement configured to effectively divide output from the DC bias adjustment 70 with output from the DC bias adjustment 76. It, for example, may implement an inverse operation that takes as input output from the DC bias adjustment 76 and a multiplier operation that takes as input output from the DC bias adjustment 70 and the inverse operation.

The frequency associated with the writing strategy can be on the order of 165 megahertz. This value, however, may change with tape speed, writing speed, etc. As such, the low pass filters 66, 74 filter out frequency content associated with the RF and FM signals respectively, in this example, greater than 50 megahertz. This value may also change with tape speed, writing speed, writing strategy pattern, etc. Due to the differing frequency responses of the RF and FM chips in the OPU 20, the delay adjustment 68 automatically applies a delay to the low pas filtered RF signal for synchronization purposes. In other embodiments, the delay adjustment 68 may be in the FM signal path. To better align the RF and FM signals for division, the DC bias adjustments 70, 76 automatically apply a DC bias to the RF and FM signals respectively. In the example of FIG. 5, this bias can average about +1.3 volts. This average, however, may change depending on design considerations, medium configuration, etc. A calibration procedure may be performed to select initial bias and delay values prior to operating at run time.

Figure 6:
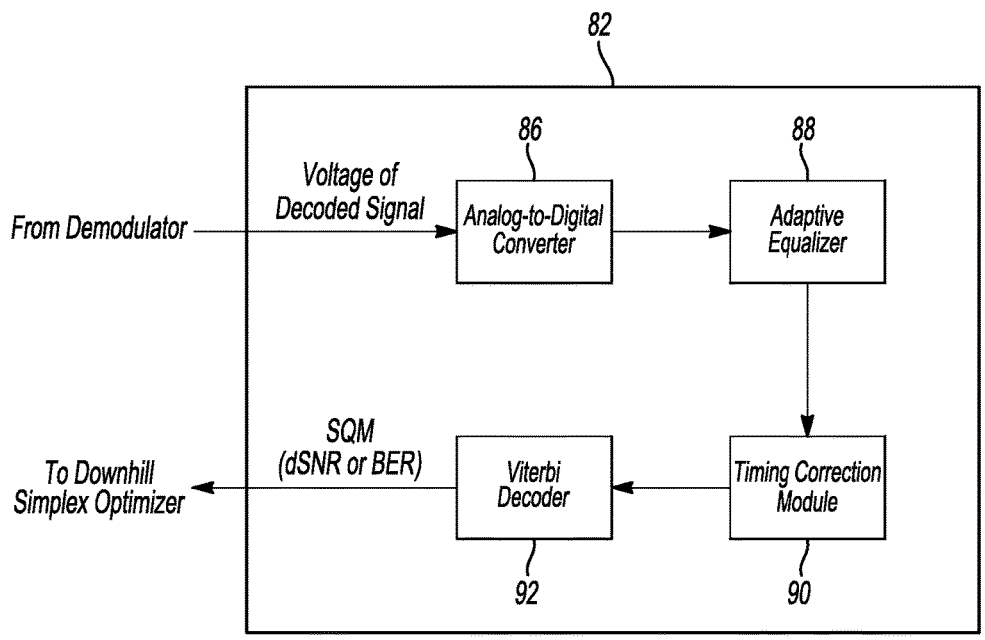
FIG. 6 is a block diagram illustrating a written data signal quality detector.

FIG. 6 shows an example of the written data signal quality detector 82 in greater detail. It includes an analog-to-digital converter (ADC) 86, an adaptive equalizer 88, a timing correction module 90, and a Viterbi decoder 92. The signal flow path follows the order in which these elements were introduced. And, the operations associated with each of these elements are performed using known techniques. The ADC 86 transforms the analog voltage signal from the demodulator 78 to a digital signal. The adaptive equalizer 88 filters the data to change the frequency response of the digital signal from the ADC 86 to improve signal quality performance. The timing correction module 90 adjusts frequency and phase of the filtered digital signal from the adaptive equalizer 88 to reduce timing error (jitter) due to optical tape speed variations. The Viterbi decoder 92 performs partial response maximum-likelihood decoding of the timing corrected filtered digital signal from the timing correction module to output decoded data and associated signal quality metrics (SQM) such as data indicative of signal-to-noise ratio (dSNR), bit error rate (BER), etc.

Figure 7:
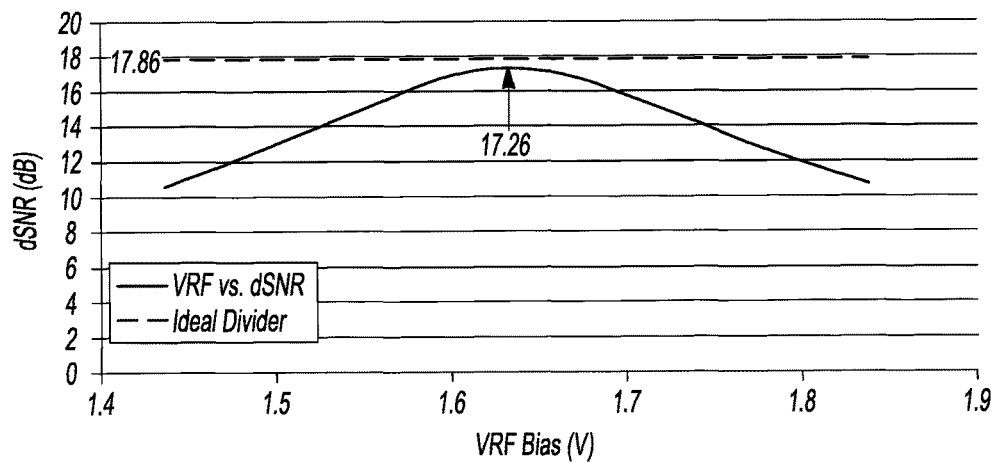
FIGS. 7, 8, and 9 are plots of signal-to-noise ratio versus RF bias voltage, FM bias voltage, and delay between RF and FM signals, respectively.
Figure 8:
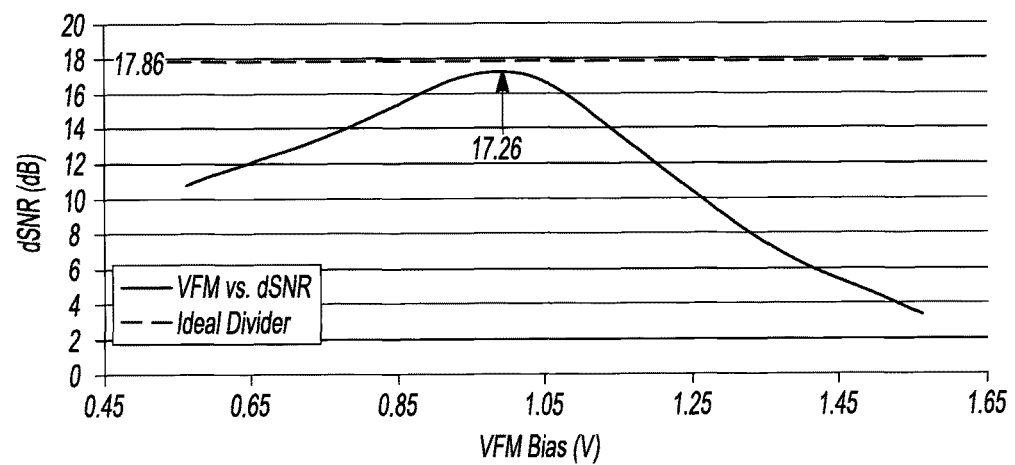
Figure 9:
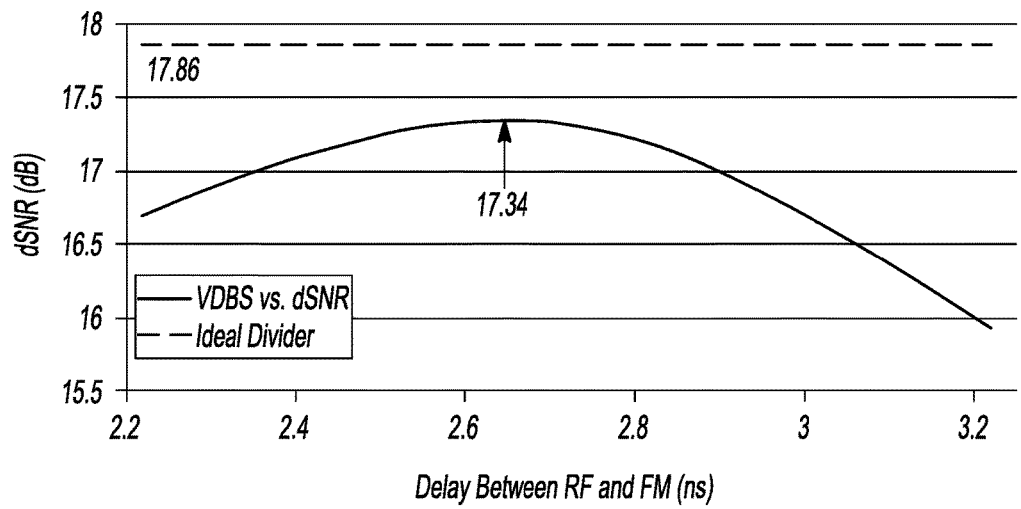

FIGS. 7, 8 and 9, show the relationship between dSNR and RF bias voltage, FM bias voltage, and delay between RF and FM signals, respectively, relative to the ideal dSNR value achievable. (Bandwidth limitations and other physical constraints limit the ability to achieve the ideal dSNR value.) Based on data from the written data signal quality detector 82, the downhill simplex optimizer 84, in this example, operates to continually identify the RF and FM DC bias voltages and the delay between RF and FM signals that maximizes the dSNR value. (In the operating range of interest, dSNR has a relationship with bit error rate (BER). As such, dSNR can be converted to BER, and vice-versa.) That is through iterative execution of the known simplex algorithm and given the current value for dSNR, the downhill simplex optimizer 84 repeatedly identifies the bias and delay values to be used in adjusting the RF and FM biases, and the delay there between. One iteration of the simplex algorithm is provided below for illustrative purposes (the best signal quality being associated with the minimum SQM in this example—the algorithm could of course be reformulated such that the best signal quality would be associated with the maximum value):

Reorder the points so that $f(SQM_{n+1}) > f(SQM_2) > f(SQM_1)$ (i.e., $SQM_{n+1}$ is the worst point)

Generate a trial point $SQM_r$ by reflection $$SQM_r = \overline{SQM} - \alpha(SQM_{n+1})$$

where $\overline{SQM} = (\Sigma_i SQM_i/N+1)$ is the centroid and $\alpha > 0$. Compute $f(SQM_r)$, and there are then 3 possibilities:

1. $f(SQM_1) < f(SQM_r) < f(SQM_n)$ (i.e., $SQM_r$ is neither the new best or worst point), replace $SQM_{n+1}$ by $SQM_r$.
2. $f(SQM_r) < f(SQM_1)$ (i.e., $SQM_r$ is the new best point), then assume direction of reflection is good and generate a new point by expansion $$SQM_e = SQM_r + \beta(SQM_r - \overline{SQM})$$

where $\beta > 0$. If $f(SQM_e) < f(SQM_r)$ then replace $SQM_{n+1}$ by $SQM_e$, otherwise the expansion has failed, replace $SQM_{n+1}$ by $SQM_r$.

3. $f(SQM_r) > f(SQM_n)$ then assume the polytope is too large and generate a new point by contraction $$SQM_c = SQM \gamma(SQM_{n+1} - \overline{SQM})$$

where $\gamma$ ($0 < \gamma < 1$) is the contraction coefficient. If $f(SQM_c) < f(SQM_{n+1})$ then the contraction has succeeded and replace $SQM_{n+1}$ by $SQM_e$, otherwise contract again.

Standard values are $\alpha=1$, $\beta=1$, $\gamma=0.5$. The downhill simplex optimizer 84 is used, in this example, because of its simplicity and speed. Other algorithms such as slope-based optimization, Newton method optimization, etc., however, can be used.

Referring again to FIG. 5, the RF and FM relative delay control signal, the RF bias control signal, and the FM bias control signal is output by the downhill simplex optimizer 84 to the delay adjustment 68, DC bias adjustment 70, and DC bias adjustment 76, respectively. These elements each implement standard circuitry to, in response to the control signals, alter the signal DC bias or delay as the case may be. In embodiments that implement at least the RF path in digital form, the delay adjustment 68 may take the form of a Farrow structure phase delay interpolator, which may allow for finer delay adjustment relative to other delay operations. In other embodiments, any one of the delay adjustment 68, DC bias adjustment 70, and DC bias adjustment 76 (or combinations thereof) may of course be fixed (not automatically adjusted) as desired. That is, the DRAW demodulation circuit 62 dynamically adjusts (automatically tunes) the bias and delay associated with the RF and FM signals to improve performance (e.g., to attempt to achieve maximum signal quality, to attempt t).

Figure 10:
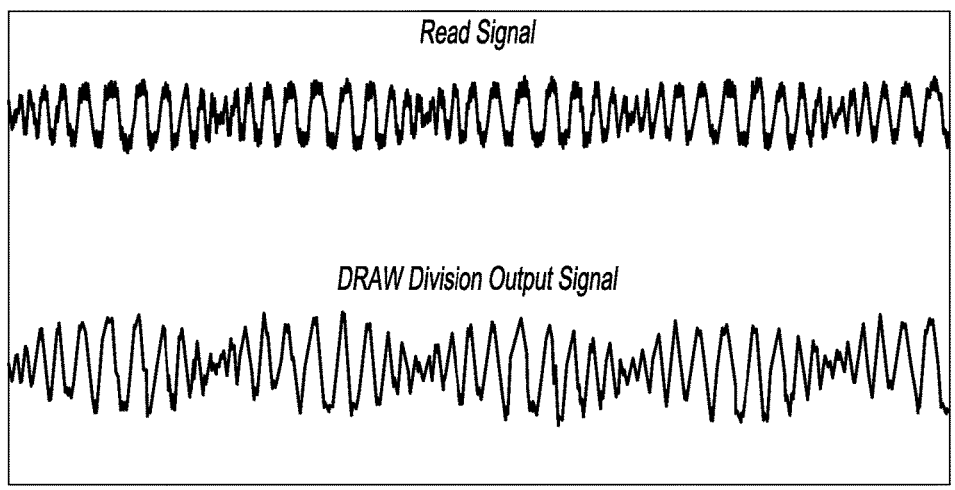
FIG. 10 is a plot comparing, for the same data, a read signal generated during a read operation (top waveform) and a DRAW division output signal generated by the DRAW demodulation circuit of FIG. 5 during a write operation (bottom waveform).

FIG. 10 shows the similarity between a read signal generated during a read operation (top waveform) and, for the same data, a DRAW division output signal generated by DRAW division output 80 during a write operation (bottom waveform).

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An optical storage system for performing direct read after write on an optical medium, the optical storage system comprising:
    an optical head configured to provide a main beam and a side beam to an optical medium; and
    a controller configured to:
        write data to the optical medium via the main beam;
        read, directly after the writing, feedback from the side beam being reflected from the optical medium, the feedback including the written data and noise;

generate output indicative of the data from division of a first signal indicative of the read feedback and a second signal indicative of the main beam to remove the noise; and automatically adjust at least one of a direct current (DC) bias or delay associated with at least one of the first and second signals according to a signal quality of the output.

2. The system of claim 1, wherein automatically adjusting at least one of a DC bias or delay includes adjusting a DC bias of the first signal.

3. The system of claim 1, wherein automatically adjusting at least one of a DC bias or delay includes adjusting a DC bias of the second signal.

4. The system of claim 1, wherein automatically adjusting at least one of a DC bias or delay includes adjusting a delay between the first and second signals.

5. The system of claim 1, wherein the signal quality is indicative of a signal to noise ratio.

6. The system of claim 1, wherein the optical medium is an optical tape.

7. The system of claim 1, wherein the optical head is further configured to split a light beam into the main beam and the side beam.

8. An optical storage system for performing direct read after write on an optical medium, the optical storage system comprising:

an optical head configured to provide a main beam and a side beam to an optical medium; and a controller configured to:
write data to the optical medium via the main beam;
directly after the writing, process a first signal resulting from the side beam being reflected from the optical medium, the first signal including the written data and noise caused by the main beam and a second signal indicative of the main beam to remove the noise and generate output indicative of the written data; and
automatically adjust a direct current (DC) bias of at least one of the first and second signals according to a signal quality of the output.

9. The system of claim 8, wherein the controller is further configured to automatically adjust a delay of at least one of the first and second signals according to the signal quality of the output.

10. The system of claim 8, wherein the processing includes dividing the first signal by the second signal.

11. The system of claim 8, wherein the signal quality is indicative of a signal to noise ratio.

12. The system of claim 8, wherein the optical medium is an optical tape.

13. The system of claim 8, wherein the optical head is configured to split a light beam into the main beam and the side beam.

14. An optical storage system for performing direct read after write on an optical medium, the optical storage system comprising:

an optical head configured to provide a main beam and a side beam to an optical medium; and a controller configured to:
write data to the optical medium via the main beam;
read, directly after the writing, feedback from the side beam being reflected from the optical medium, the feedback including the written data and noise;
process the feedback using data indicative of the main beam to remove the noise and generate output indicative of the written data; and
automatically adjust a delay of at least one of the feedback or the data indicative of the main beam based on a signal quality of the output.

15. The system of claim 14, wherein the processing includes dividing the feedback by the data indicative of the main beam.

16. The system of claim 14, wherein the feedback and data indicative of the main beam each take form of an analog signal.

17. The system of claim 14, wherein the controller is further configured to automatically adjust a direct current (DC) bias of at least one of the feedback or the data indicative of the main beam based on the signal quality of the output.

18. The system of claim 14, wherein the signal quality is indicative of a signal to noise ratio.

19. The system of claim 14, wherein the delay is automatically adjusted via a Farrow structure phase delay interpolator.

20. The system of claim 14, wherein the optical medium is an optical tape.

* * * * *

UNITED STATES PATENT AND TRADEMARK OFFICE
CERTIFICATE OF CORRECTION

PATENT NO.        : 9,911,450 B1
APPLICATION NO.   : 15/243457
DATED             : March 6, 2018
INVENTOR(S)       : Wang et al.

Page 1 of 1

It is certified that error appears in the above-identified patent and that said Letters Patent is hereby corrected as shown below:

In the Specification

In Column 7, Line 67, delete "$SQM_c = SQM\ \gamma(SQM_{n+1} - \overline{SQM})$" and insert -- $SQM_c = \overline{SQM} + \gamma(SQM_{n+1} - \overline{SQM})$ --, therefor.

Signed and Sealed this
Twenty-first Day of August, 2018

Andrei Iancu
*Director of the United States Patent and Trademark Office*